(12) United States Patent
Erbil et al.

(10) Patent No.: US 11,889,918 B2
(45) Date of Patent: Feb. 6, 2024

(54) GUN RACK AND A GUN HOLDER ASSEMBLY

(71) Applicant: SECANT TEKNOLOJI GELISTIRME SAN. VE TIC. A. S., Eskisehir (TR)

(72) Inventors: Yilmaz Erbil, Eskisehir (TR); Serdar Guzel, Eskisehir (TR)

( * ) Notice: Subject to any disclaimer, the term of this patent is extended or adjusted under 35 U.S.C. 154(b) by 0 days.

(21) Appl. No.: 17/998,055

(22) PCT Filed: May 6, 2021

(86) PCT No.: PCT/TR2021/050437
§ 371 (c)(1),
(2) Date: Nov. 7, 2022

(87) PCT Pub. No.: WO2021/225554
PCT Pub. Date: Nov. 11, 2021

(65) Prior Publication Data
US 2023/0165367 A1    Jun. 1, 2023

(30) Foreign Application Priority Data

May 6, 2020   (TR) ................................ 2020/07018
May 6, 2021   (TR) ................................ 2021/007751

(51) Int. Cl.
*A47B 81/00* (2006.01)
*B60R 7/14* (2006.01)
*F41A 23/00* (2006.01)

(52) U.S. Cl.
CPC .............. *A47B 81/005* (2013.01); *B60R 7/14* (2013.01); *F41A 23/005* (2013.01)

(58) Field of Classification Search
CPC ....... A47B 81/005; B60R 7/14; F41A 23/005; F41A 23/18; F41C 33/06
See application file for complete search history.

(56) References Cited

U.S. PATENT DOCUMENTS 5,802,889 A * 9/1998 Arnold ..................... B62H 5/14
                                                        211/5
5,934,112 A * 8/1999 Rice ........................ F41A 23/18
                                                        211/8

(Continued)

FOREIGN PATENT DOCUMENTS

WO    WO-2020171754 A1 *  8/2020  ............... B60R 7/14

OTHER PUBLICATIONS

International Search Report for corresponding PCT/TR2021/050437 dated Aug. 20, 2021.

(Continued)

*Primary Examiner* — Stanton L Krycinski
(74) *Attorney, Agent, or Firm* — Egbert, McDaniel & Swartz, PLLC

(57) ABSTRACT

Disclosed is a gun rack structure that ensures the secure fixation of rifles and long-barreled weapons. More specifically the gun rack is applicable to weapons that are ready to be used at any time, and ensures that they are kept securely by fixing it to a certain place indoors or inside a vehicle. Thanks to the adjustable structure of the gun rack, it can be adapted to different fore-end and barrel structures, after the weapon is placed, it is activated with one move that provides to fix the fore-end or barrel and likewise it is inactivated with one move that provides to disengage the fore-end or barrel. The disclosed gun rack and gun holder assembly give military personnel the practicality they need.

7 Claims, 15 Drawing Sheets

(56) References Cited

U.S. PATENT DOCUMENTS

| | | | |
|---|---|---|---|
| 5,979,846 A | 11/1999 | Flurh | |
| 7,047,771 B2* | 5/2006 | Tanos | B60R 7/14 |
| | | | 70/279.1 |
| 8,950,596 B2* | 2/2015 | Arabian | G07C 9/30 |
| | | | 211/64 |
| 8,991,224 B2* | 3/2015 | Zalavari | F41A 23/18 |
| | | | 70/279.1 |
| 9,708,835 B2* | 7/2017 | Fisher | E05B 73/0041 |
| 9,883,743 B2* | 2/2018 | Setina | B60R 7/14 |
| 9,884,593 B2* | 2/2018 | Hull | B60R 7/14 |
| 10,252,678 B2 | 4/2019 | Hull et al. | |
| 10,260,832 B2* | 4/2019 | Bowe, Jr. | F41A 23/18 |
| 10,576,900 B2* | 3/2020 | Bornais | F41A 23/18 |
| 11,110,867 B2* | 9/2021 | Franklin | A47F 7/0028 |
| 11,326,851 B1* | 5/2022 | Oldham | A47B 81/005 |
| 2013/0269509 A1 | 10/2013 | Irwin | |
| 2015/0033810 A1* | 2/2015 | Zalavari | A47B 81/00 |
| | | | 70/266 |
| 2015/0184428 A1* | 7/2015 | Zalavari | A47B 81/005 |
| 2017/0030114 A1 | 2/2017 | Fisher | |
| 2017/0072864 A1 | 3/2017 | Fife | |
| 2017/0332783 A1* | 11/2017 | Setina | B60R 7/14 |
| 2018/0170268 A1 | 6/2018 | Fisher | |

OTHER PUBLICATIONS

Written Opinion of the International Searching Authority for corresponding PCT/TR2021/050437 dated Aug. 20, 2021.

* cited by examiner

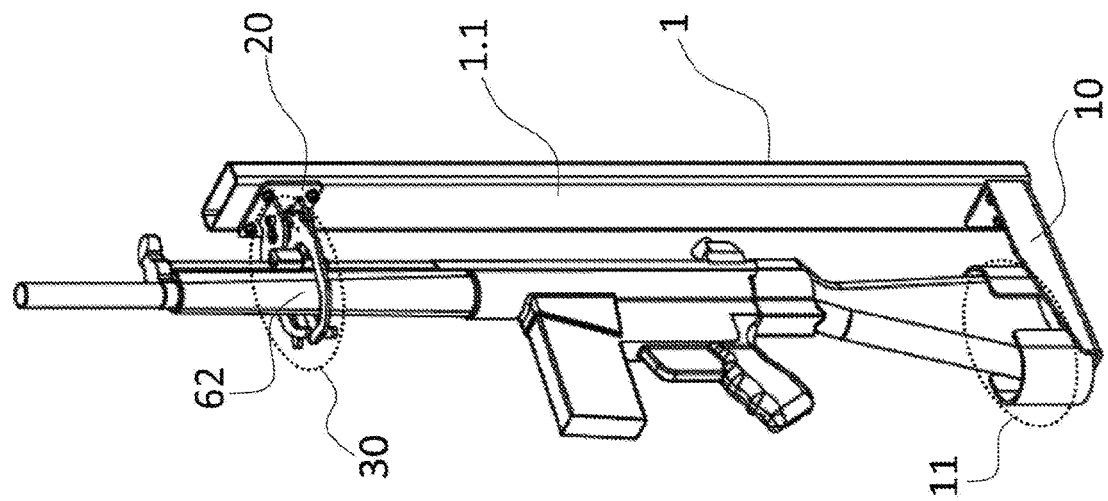
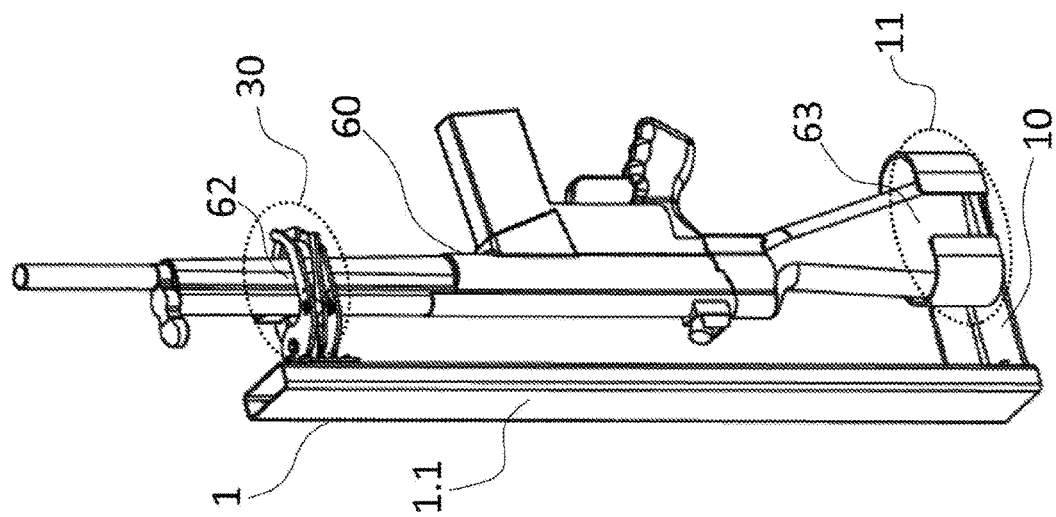
Figure 2b
Figure 2a

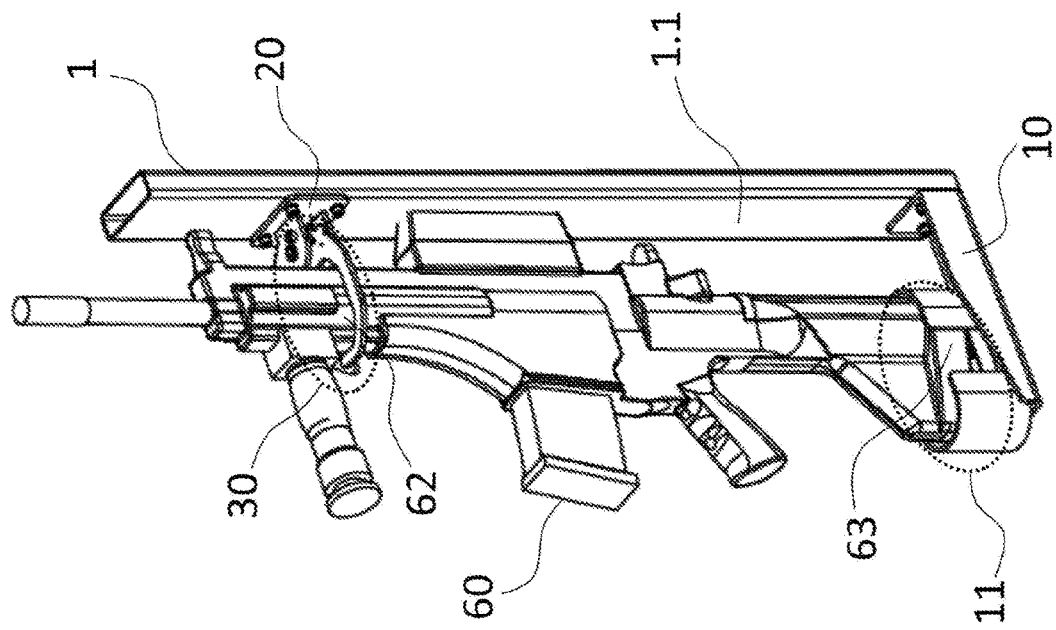
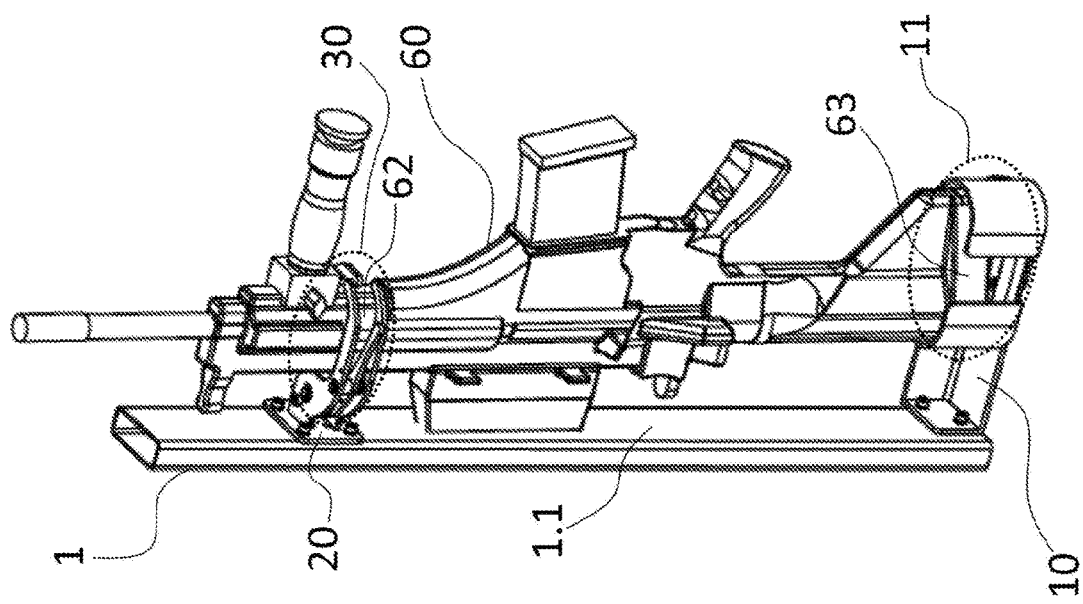
Figure 4a
Figure 4b

A(2:1)

GUN RACK AND A GUN HOLDER ASSEMBLY

TECHNICAL FIELD OF THE INVENTION

The invention relates to a holder or gun rack which ensures the safe fixation of rifles (guns, weapons) and long-barreled weapons.

More specifically the current invention, especially to the weapons that are ready to be used at any time, ensures that they are kept securely by fixing it to a certain place indoors or inside the vehicle. Thanks to the adjustable structure of invention, the invention can be adapted to different gun-stock and barrel structure, after the weapon is placed, it is activated (closed/locked) with one move that provides to fix the gun-stock or barrel and likewise it is inactivated (opened/unlocked) with one move that provides to disengage the gun-stock or barrel. This is about to a gun rack and a gun holder assembly (gun gripper jaw, gun holder system) that gives to the military personnel the practicality they need.

PRIOR ART

When rifles and long-barreled weapons are not in use by personnel, they are kept in gun holders with their barrels facing upwards. For this purpose, after the gun stock parts are placed on the base of system, the fore-end or barrel parts are leaned on the gun rack, by this way the parts are grasped by the rack system(holding slot). Even if such traditional holding structures with reclining system (reclining system structure) are suitable for placing the guns with the magazine removed, it creates a big security vulnerability as there is still the possibility of having bullets inside the gun, especially in stable places. The use of recumbent gun holders inside the vehicles exposed to vibration is extremely dangerous. The vibration occurred with the explosion of a mine in the armored vehicle may cause the weapon to come out of the gun rack and fire spontaneously, and consequently, the military personnel in the vehicle may be injured or died. For this reason, efforts are made to develop safer gun holders for fix the weapons, especially for use inside the vehicles. However, the solutions put forward are impractical and having a complex structure that brings various disadvantages such as not being able to be adjusted to each weapon and etc. This demonstrates the need for gun holder, that provides ease of use and gives the practicality the military personnel need, and which provides a single common solution for many different weapon types by adjusting for each fore-end or barrel structure.

In the patent document numbered US5979846A mentions a general holder design that is not adjustable.

In the patent document numbered US2013269509A1 mentions a mechanism that uses a mechanism that locks the holder and a mechanism that can also be configured as an electric drive. However, the mechanism is neither same with our invention, nor it has an adjustable structure. The rubber insert inside is partially harmonized to the other types of weapons by changing its structure.

In the patent document numbered US2017072864A1, there is a holder design that stands out with its ability to be engaged to different platforms but it does not have an adjustable structure.

As a result, the need for a gun rack that provides a single solution for many different types of weapons by adjusting to each fore-end or barrel structure has led to the emerge of the present invention.

OBJECTIVES AND SHORT DESCRIPTION OF THE INVENTION

The aim of the present invention is to ensure that weapons that are ready to be used at any time can be kept securely by fixing them to a certain place or inside the vehicle, thanks to its adjustable structure; it can be adapted to weapons with different fore-end or barrel structures, can be closed/locked with one move (motion) by fixing the fore-end or barrel and in the same way can be opened/unlocked in one step after the weapon is placed, also this ease gives military personnel the practicality they need.

The present invention is a gun rack configured to ensure the guns to be securely fixed, and, in order to provide a practical and adjustable structure according to the fore-end or barrel structure of any type of gun; it comprises following components;

a first fixed part, a second fixed part positioned as being parallel to mentioned first fixed part with a distance,
  a movable part which has a geared surface with at least one knurl structure, is rotatably connected between the mentioned first fixed part and the second fixed part as being parallel to them in a first axis and thus, allows the gun rack to be opened and closed,
  a latch which has a handle part on one side and a clawed surface with at least one claw structure in a way that comes across mentioned geared surface on the other side, is rotatably connected between the mentioned first fixed part and the second fixed part as being parallel to them in a second axis and thus, allows mentioned movable part to be fixed in the closed position.

In order to provide additional security, a preferred embodiment of the present invention comprises following components;

a geared slot configured on the axis of rotation of said movable part,
  a geared part that prevents rotation of the movable part by placing inside the mentioned geared slot in the closed position of the mentioned movable part,
  a security lock that allows mentioned geared part to be pulled upwards as remaining said geared part outside of the geared slot by being connected to said geared part via a geared part connection,
  a security pin which is rigidly connected with mentioned geared part connection and thus, stores motion energy required for movement in the reverse direction by compressing security spring which is remaining between the second fixed part and itself by moving upward when the mentioned security lock is pulled up.

In a preferred embodiment of the invention, said security lock comprises at least one side extension and at least one fixing protrusion at the bottom.

In a preferred embodiment of the invention, the first fixed part comprises at least one fixing bore coinciding to the mentioned fixing protrusion or protrusions.

In order to provide additional security, a preferred embodiment of the present invention comprises a security lock which has a security lock protrusion that enables the security lock to be fixed in its active position by preventing its upward movement and
  is connected rotatably around its own axis on the first fixed part.

In a preferred embodiment of the invention, mentioned security lock comprises a security lock claw that prevents said security lock from rotating freely around its own axis by sitting on the outer upper edge of the first fixed part when the security lock is in active state.

The present invention is a gun holder assembly which comprises preferably a body structure in order to ensure the guns to be securely fixed and, also comprises a gun rack, according to any one of the preceding claims, which is mounted on the upper part of the body or a structure such as a column, wall etc. inside a vehicle or place.

DESCRIPTION OF THE FIGURES

In FIG. 2a, a side perspective view of a gun holder system with a gun rack structure according to the invention in which a G3 type weapon is placed is given.

In FIG. 2b, other side perspective view of a gun holder assembly with a gun rack structure according to the invention, in which a G3 type weapon is placed is given.

In FIG. 4a, a side perspective view of a gun holding assembly with an inventive gun rack structure in which an MPT76 type weapon is placed is given.

In FIG. 4b, another side perspective view of a gun holding assembly with an inventive gun rack structure in which an MPT76 type weapon is placed is given.

REFERENCE NUMBERS

Figure 1B:
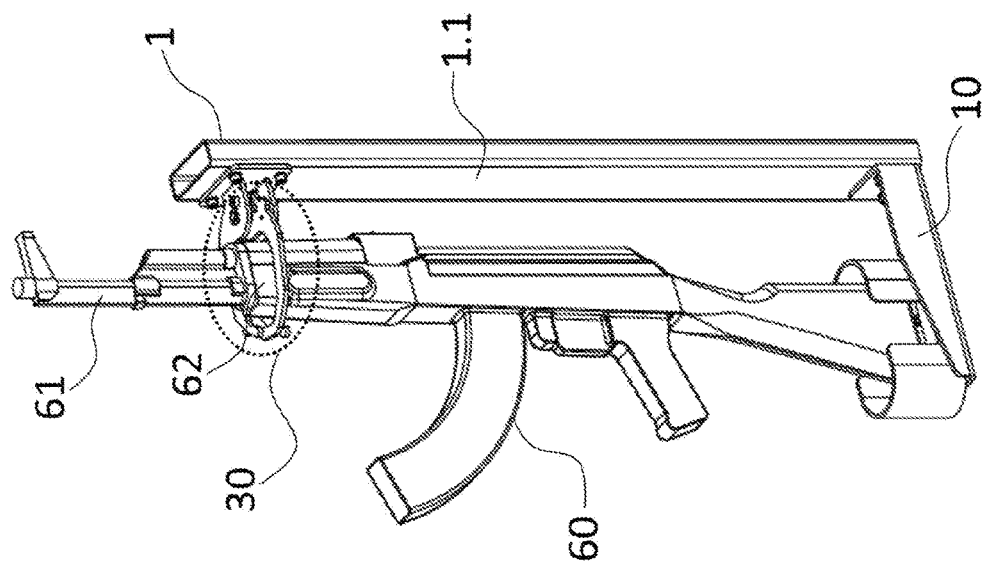
In FIG. 1b, other side perspective view of a gun holder system with an inventive gun rack structure in which an AK47 type weapon is placed is given.

1. Gun holder assembly
1.1. Body structure
10. Lower bracket
11. Gun-Stock holder
20. Upper bracket
30. Gun Rack
31. First fixed part
31.1. First connection bore
31.2. Fixing bores
32. Second fixed part
32.1. Second connection bore
33. Movable part
33.1. Guide channel
33.2. Guide protrusion
33.3. Geared surface
33.4. Knurl
33.5. Spring
33.6. Geared slot
33.7. Rotation limiting part
34. Latch
34.1. Handle Part
34.2. Claw
34.3. Latch spring
34.4. Latch connector
34.5. Clawed surface
40. Connection element
50. Pin
60. Weapon
61. Barrel
62. Fore-end
63. Gun stroke
70. Security lock
71. Side extension
72. Fixing protrusion
73. Geared connection bore
80. Security pin
81. Security pin end
82. Geared part slot
83. Motion blocker protrusion
85. Security lock
86. Security lock protrusion
86.1. Security lock claw
87. Security spring
88. Geared part
89. Geared part connection
(I). First axis
(II). Second axis
100. Opening direction
200. Closing direction
300. Force application direction

DETAILED DESCRIPTION OF THE INVENTION

The present invention is about a gun rack (30) and gun holder assembly (1) that particularly suitable for weapons (60) that are ready to be used at any time can be kept securely by fixing them to a certain place or inside the vehicle, thanks to its adjustable structure; it can be adapted to weapons (60) with different fore-end (62) or barrel (61) structures, after the weapon (60) is placed, it can be closed/locked with one move by fixing the fore-end (62) or barrel (61) and in the same way can be opened/unlocked in one step, also this ease gives military personnel the practicality they need. Thanks to the inventive gun rack (30), military personnel can fixed the weapon (60) to the holding system (1) with a single movement and in the same way, it has become possible to take the weapon(60) from the weapon holding system (1) with a single movement. This allows the military personnel, who is constantly ready for possible conflicts, attacks, etc., to move faster. In addition, the current invention gun rack (30) can be adjusted according to the size of the weapon's (60) fore-end (62) or barrel (61) which are placed inside. This features allow only one type of weapon holder system(1) to be used for different types of weapons (60), eliminate the situation of use of individual weapon holders (1) for each type of weapon (60). Moreover, the gun rack (30) can be adjusted according the size of the weapon's (60) fore-end (62) or the barrel (61) which are placed in it, and by means of tightly clamps around the area of fore-end (62) or barrel (61) ensuring that the weapon (60) is not affected by external vibrations.

Figure 1A:
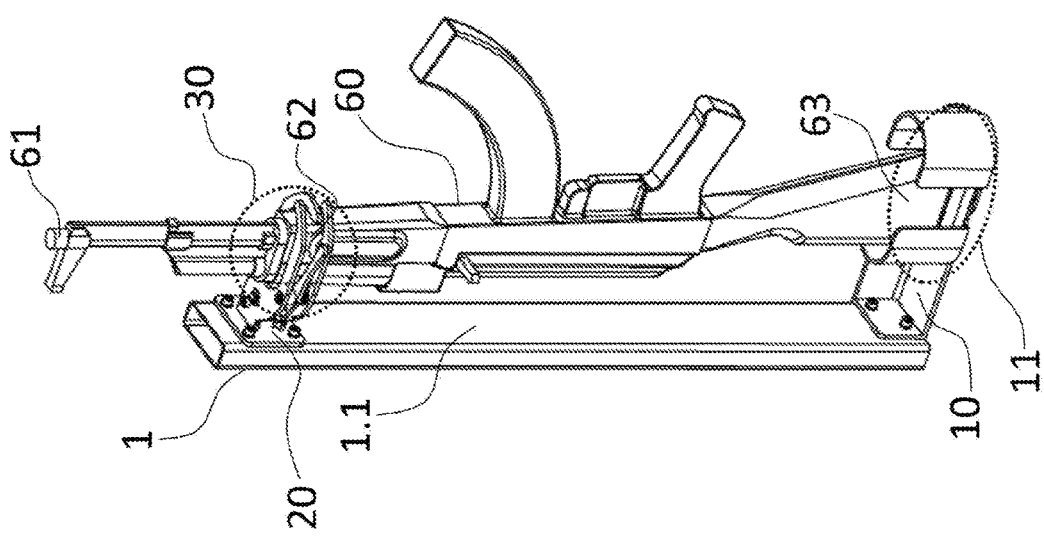
In FIG. 1a, a side perspective view of a gun holder system with an inventive gun rack structure in which an AK47 type weapon is placed is given.
Figure 3A:
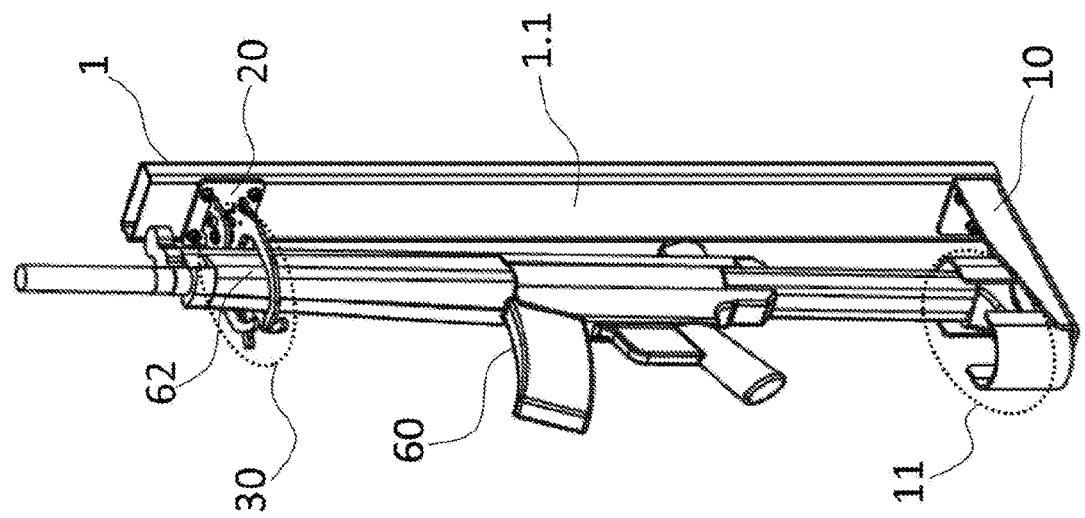
In FIG. 3a, a side perspective view of a gun holder assembly with a gun rack structure according to the invention in which a HK33 type weapon is placed is given.
Figure 3B:
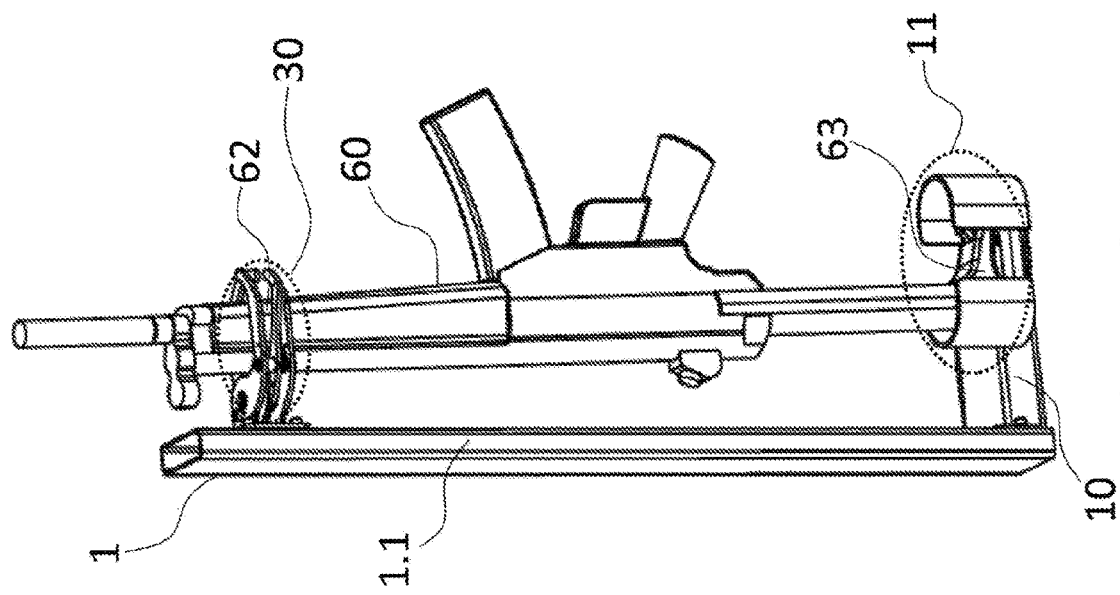
In FIG. 3b, other side perspective view of a gun holder assembly with a gun rack structure according to the invention in which a HK33 type weapon is placed is given.
Figure 5A:
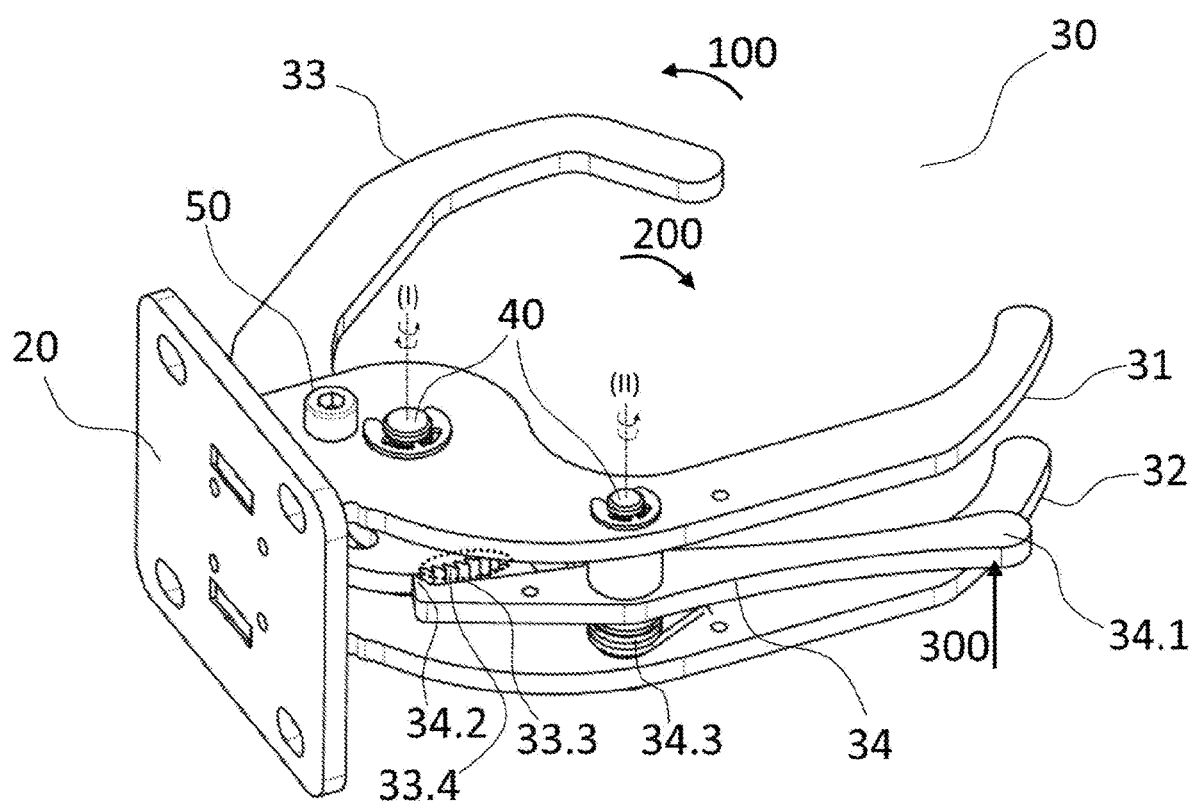
In FIG. 5a, a rear perspective view of the open state of the inventive gun rack is given.
Figure 5B:
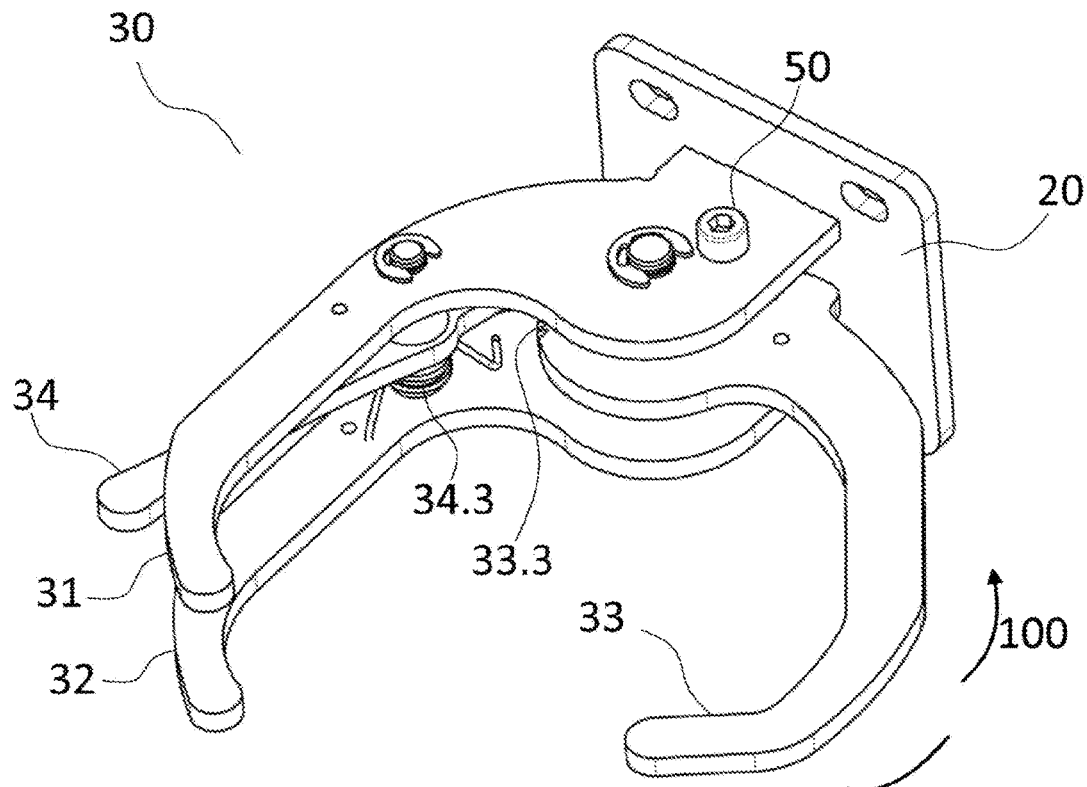
In FIG. 5b, a front perspective view of the open state of the subject gun rack is given.
Figure 5C:
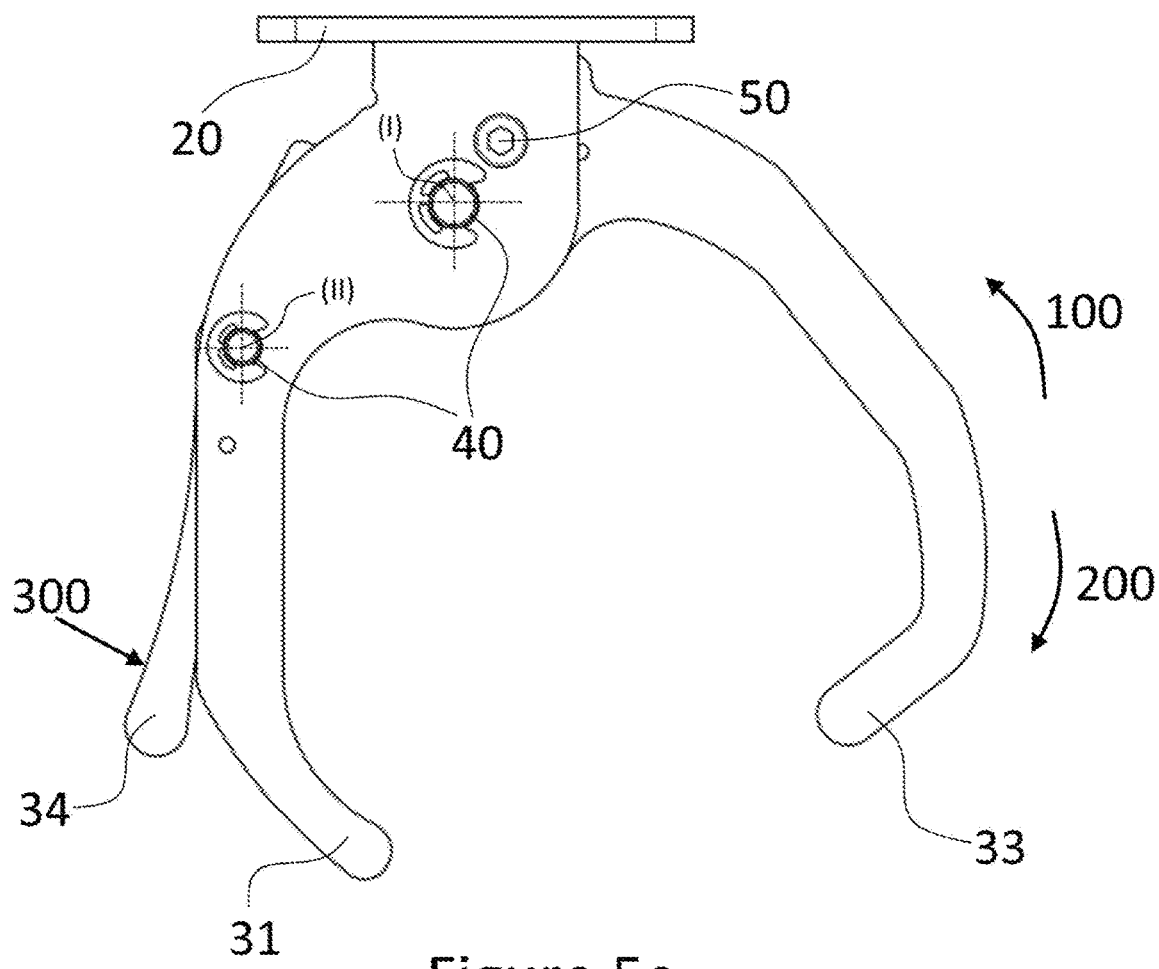
In FIG. 5c, a top view of the inventive gun rack is given.
Figure 5D:
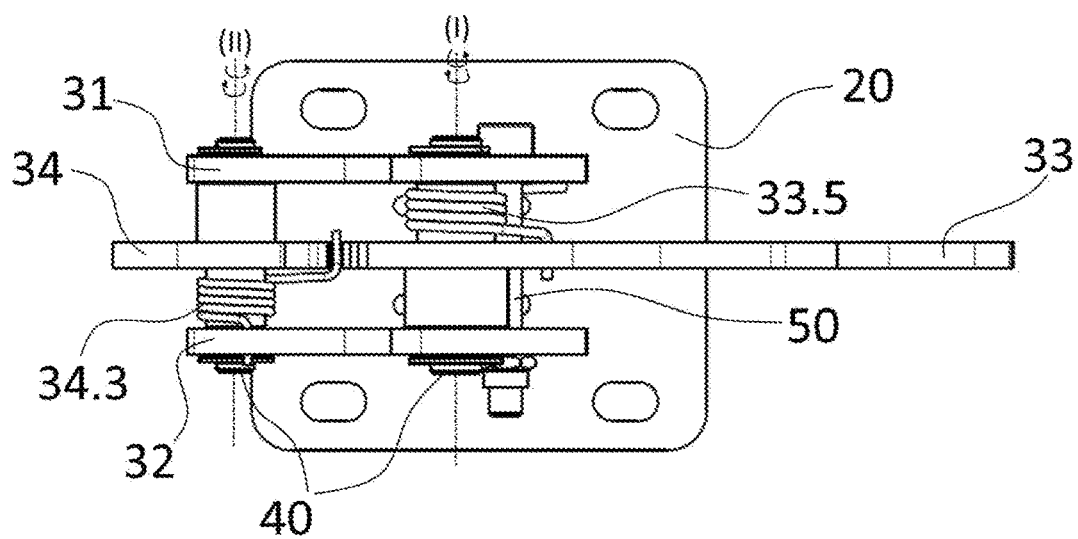
In FIG. 5d, a front view of the open state of the inventive gun rack is given.
Figure 6A:
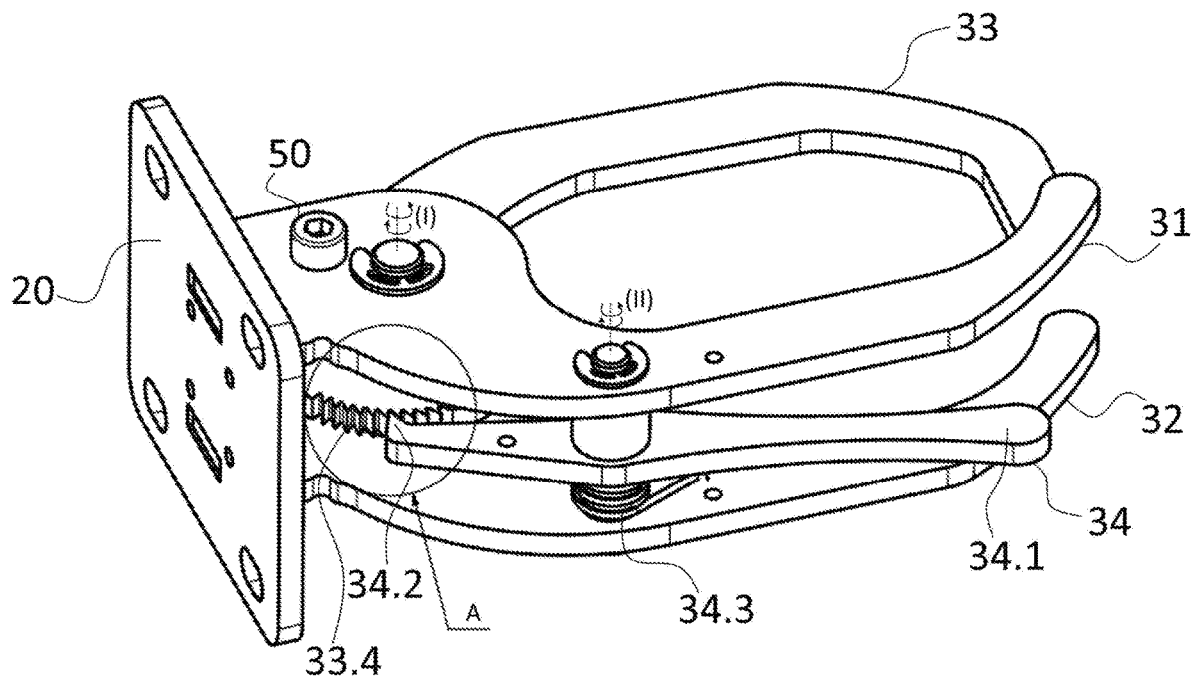
In FIG. 6a, a side perspective view of the closed state of the inventive gun rack is given.
Figure 6B:
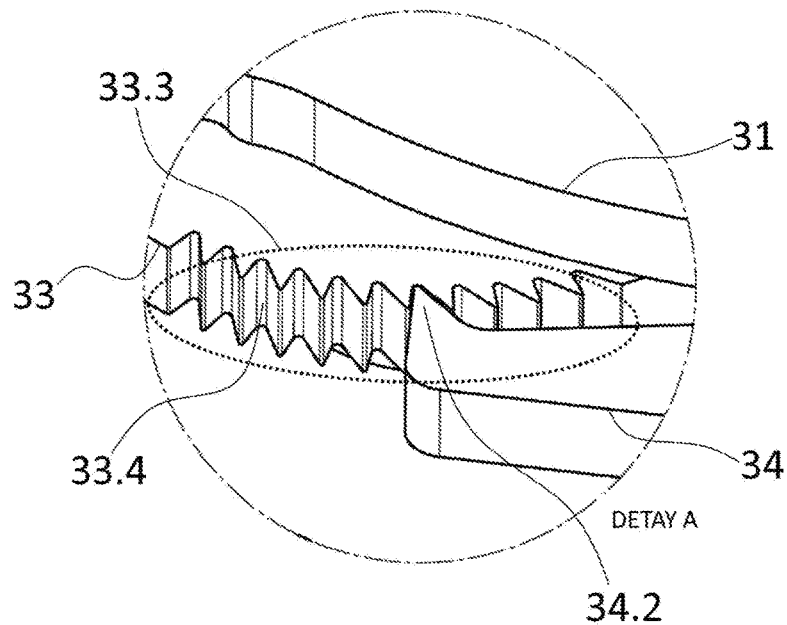
In FIG. 6b, a close perspective view of the gear lock mechanism in the closed state of the inventive gun rack is given.
Figure 6C:
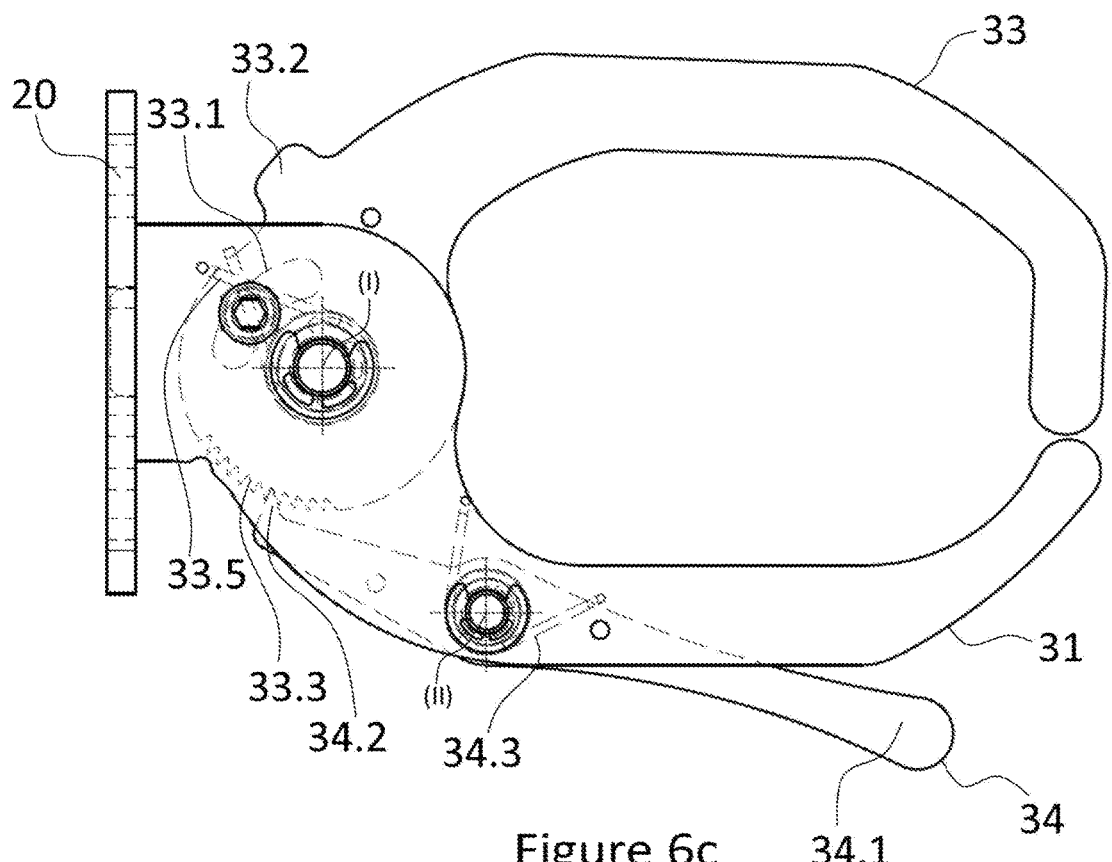
In FIG. 6c, a top view of the closed state of the inventive gun rack is given.
Figure 6D:
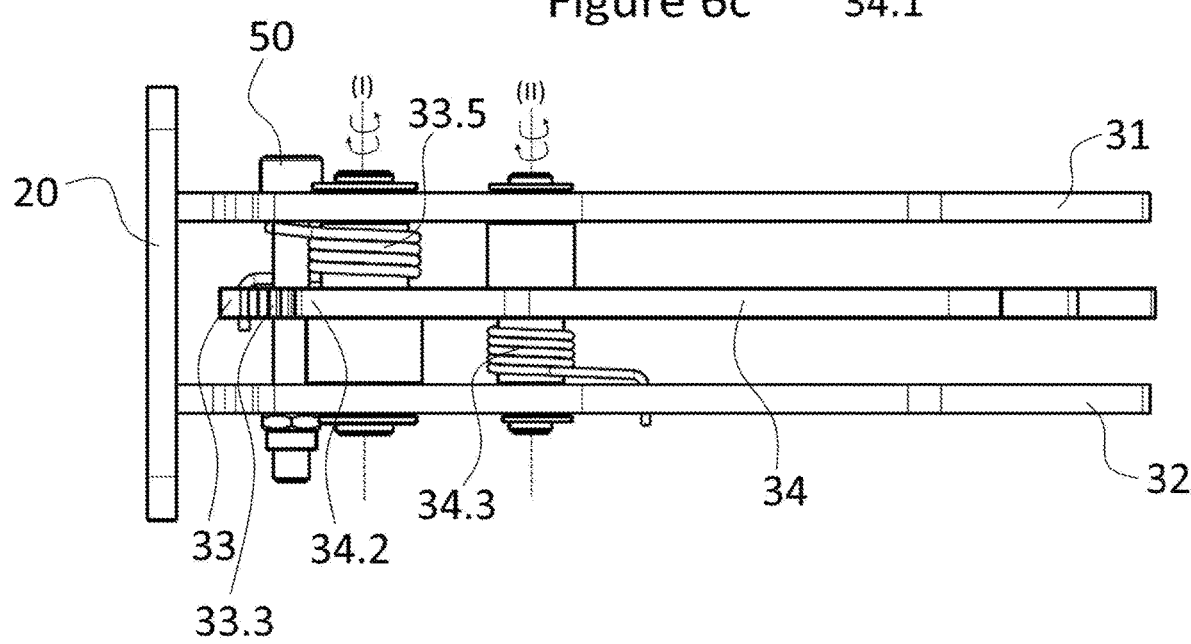
In FIG. 6d, a side view of the closed state of the inventive gun rack is given.

The images revealed in FIG. 1a-6d relate to the most basic form of the gun rack (30).

As can be seen from these figures, the subject of invention is the gun rack (30) that includes; the first fixed part (31), the second fixed part (32), the movable part (33) and the latch (34) components.

Also the subject of the invention is the gun holder assembly (1) with gun rack (30) preferably consist of a body structure (1.1), a gun-stock holder (11) positioned at the gun stroke (63) of the mentioned body structure (1.1); the first fixed part (31), second fixed part (32), movable part (33) and latch (34) components are placed on the upper part of the mentioned body structure. The mentioned body structure (1.1) can be a structure as a tool or can be as a column, wall etc in indoor. In one of the preferred embodiments, the mentioned gun-stock holder (11) is engaged with the body structure (1.1) by means of a lower bracket (10). In another preferred embodiment, the gun rack (30) is engaged with the body structure (1.1) by means of an upper bracket (20).

The mentioned first fixed part (31) and second fixed part (32) are C-shaped and are fixed to the upper bracket (20) and parallel to each other with a certain distance between them. The inverted C-shaped movable part is rotatably engaged between the first fixed part (31) and the second fixed part (32), which are parallel to each other, via a connection element (40) and spring (33.5) in first axis (I). There is a guide channel (33.1), a guide protrusion (33.2) and a geared surface (33.3) on the mentioned movable part (33). First fixed part (31) and the second fixed part (32) can be locked by locking pin (50) which passed through the mentioned guide channel (33.1). Thus, the movement of the movable part (33) in both directions is limited by the pin (50), allowing it to move only along the direction limited by the guide channel (33.1). In another preferred embodiment of the weapon holder structure, the mentioned pin (50) and guide channel (33.1) are not used, and the opening amount of the movable part (33) is limited by the way that from the guide protrusion (33.2) touching and back to the upper bracket (20).

The spring (33.5) placed around the connection element (40) that is between the movable part (33) and the first fixed part (31) ensures that the movable part (33) to be engaged in a way that tends to stand open. For this, one end of the spring (33.5) is fixed to the pin (50), the other end of the spring is fixed by the movable part's guide protrusion (33.2). When force is applied on the movable part (33), the fore-end (62) and barrel (61) is locked inside the gun rack (30), the spring (33.5) is locked and stretched between pin (50) and movable part's guide protrusion (33.2), thereby there is storing potential energy on it. When the closed movable part is loosened, this potential energy stored provides the force to enable the movable part (33) to return to the open position.

The mentioned latch (34) is engaged rotatably between the first fixed part (31) and the second fixed part (32) by means of another connection element (40) and the latch spring (34.3) on a second axis (II). The claw (34.2) part of the latch (34), which has a claw (34.2) on one side and a handle part (the force application part) (34.1) on the other side, is engaged to the geared surface (33.3) of the movable part (33). As long as no force is applied on the handle part (34.1) of the latch (34), the latch (34) and its claw (34.2) structure will be in a close-state in a way that it touches the movable part (33). The latch spring (34.3) placed around the connection element (40) between the movable part (33) and the first fixed part (31), it ensures that the latch (34) is engaged in a manner that tends to remain closed. For this, one end of the latch spring (34.3) is fixed to the second fixed part (32). With the claw (34.2) part of the latch (34) moves on the geared surface (33.3) of the movable part (33), the closing amount of the gun rack (30) is adjusted according to the size of weapon's the fore-end (62) or the barrel (61) in the gun rack (30). The direction of the knurl (33.4) on the geared surface (33.3) is designed inclined towards the opposite of the closing direction (200) so that the movable part (33) can move in the closing direction (200). This inclination direction also prevents the movable part (33) from moving in the opening direction (100) and enables the claw (34.2) to lock the movable part (33) in the desired gear spacing. In order to prevent the weapon (60) from being affected by external vibrations, it is very important that the claw (34.2) pushes forward on the geared surface (33.3) until the gun rack (30) completely wraps the fore-end (62) or barrel (61) of the weapon (60) up to the end point allowed by the fore-end (62) or barrel (61) sizes.

The geared surface (33.3) must include at least one knurl (33.4). It is preferred that the number of knurl (33.4) is higher in order to be able to adjust the gun rack (30) according to different types of gun fore-end (62) or barrel (61) structures. The changes such as increasing the number of knurl (33.4) and reducing the angle between knurls (33.4) allow more precise adjustment in the wider weapon (60) spectrum.

When a force is applied on the handle part (34.1) of the latch (34) in the force application direction (300), the claw (34.2) is moved backwards from the geared surface (33.3) and the movable part (33) is disengaged. Potential energy previously stored on the spring (33.5) returns the disengaged movable part (33) to its initial position by applying a force towards the opening direction (100).

As can be understood from all these explanations, thanks to the gear structure of the gun rack (30), it can be easily adjusted according to the fore-end (62) or barrel (61) structure of different types of weapons (60). For this, it is enough to move the movable part (33) towards the closing direction (200). In the meantime, a gradual and controlled closing is provided by the movement of the claw (34.2) structure on the knurl (33.4) on the geared surface (33.3). From the figures, it is possible to see how the inventive gun rack (30) adapts according to the dimensions of the fore-end (62) of the AK47, G3, HK33, MPT76 type weapons (60). In order to remove the weapon (60) from the gun holder assembly (1), it is enough to apply force on the handle part (34.1) of the latch (34) in the direction of force application direction (300). Thus, the required speed and practicality by the military personnel in placing the gun in the gun rack (30) and taking it from the gun rack is gained.

Moreover, thanks to the unidirectional progression of the claw (34.2) structure on the geared surface (33.3) and it can be fixed between the knurls (33.4), even in cases where shock and vibration are exposed, such as a mine explosion, bad environmental conditions and etc. the latch (34) does not disengaged the gear (33,4) and provides the necessary protection and safety.

Figure 7:
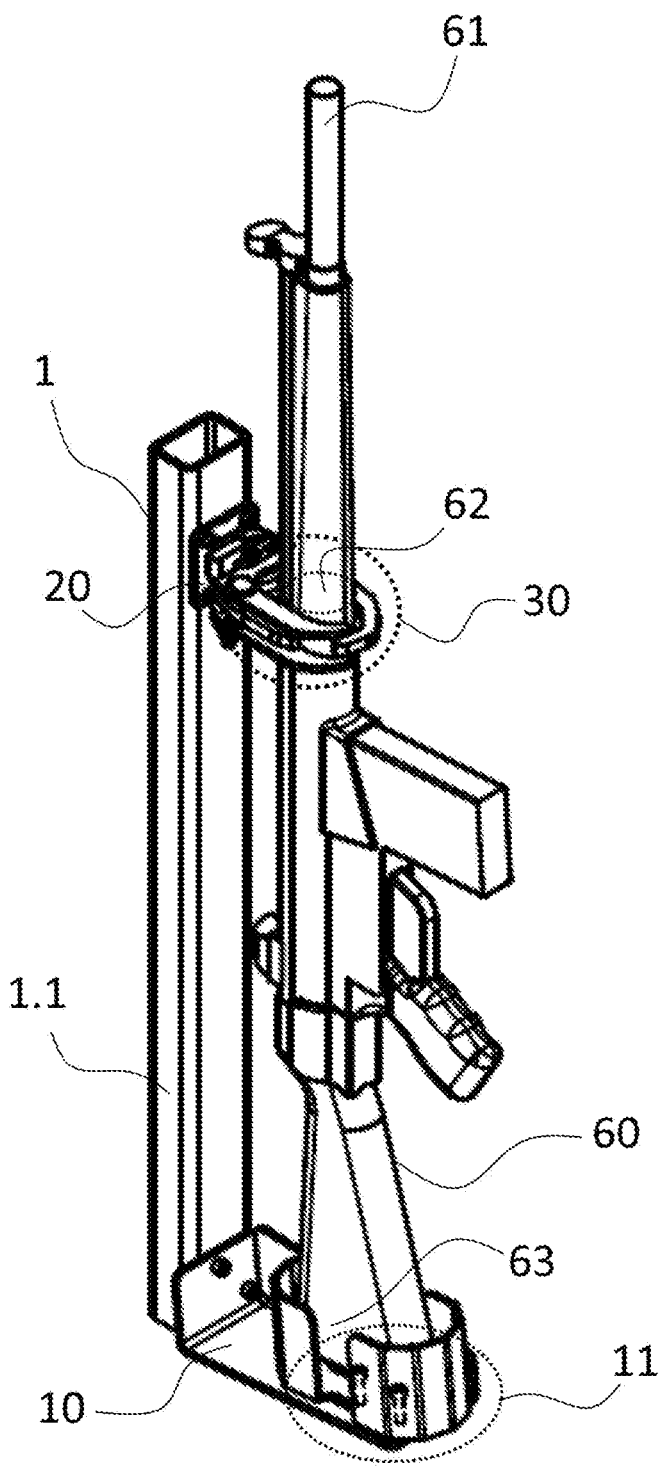
In FIG. 7, a perspective view of the gun holder assembly including the gun rack structure with the inventive security mechanism is given.
Figure 8:
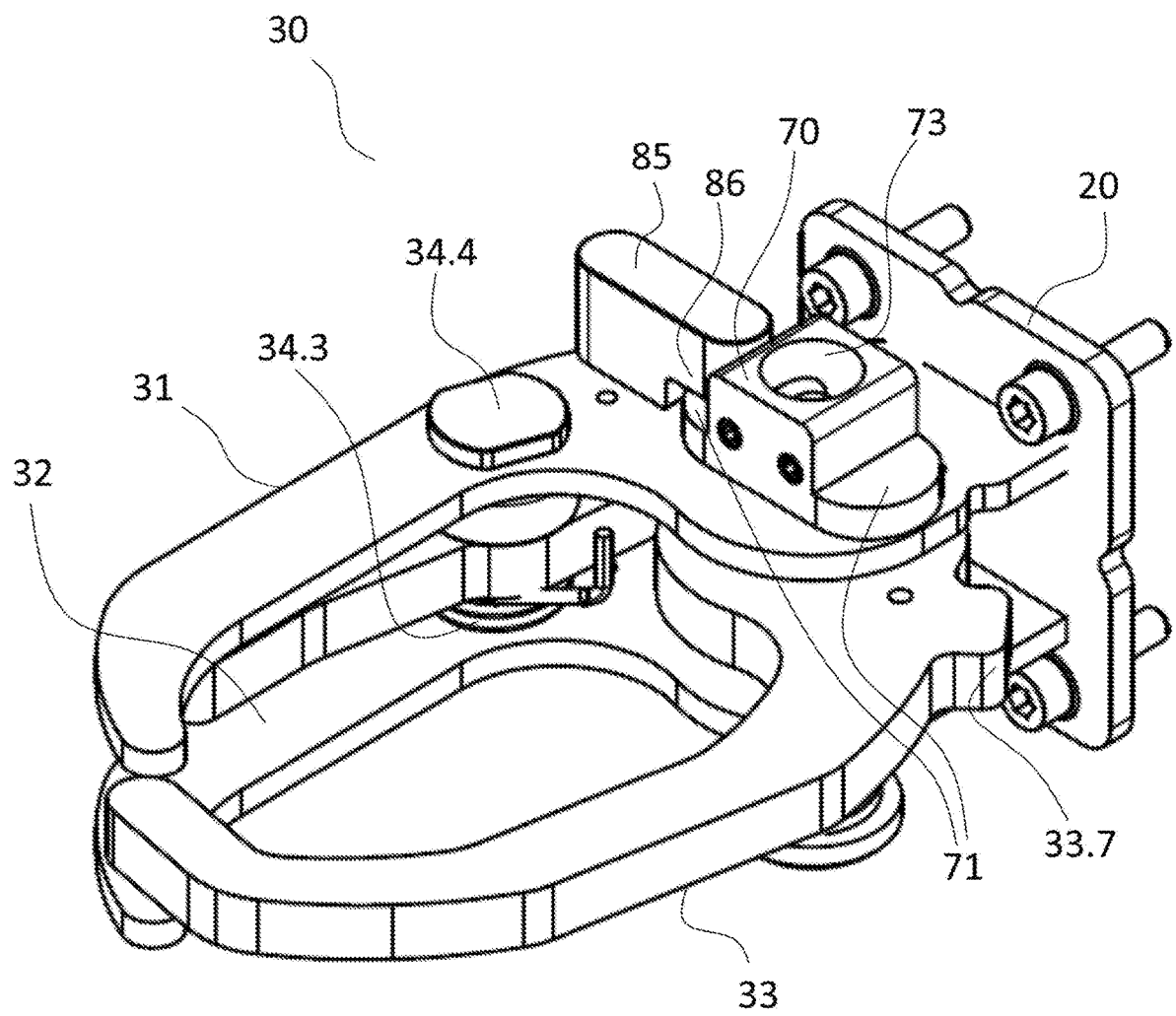
In FIG. 8, a perspective view regarding the locked state of the gun rack structure with the inventive security mechanism is given.
Figure 9A:
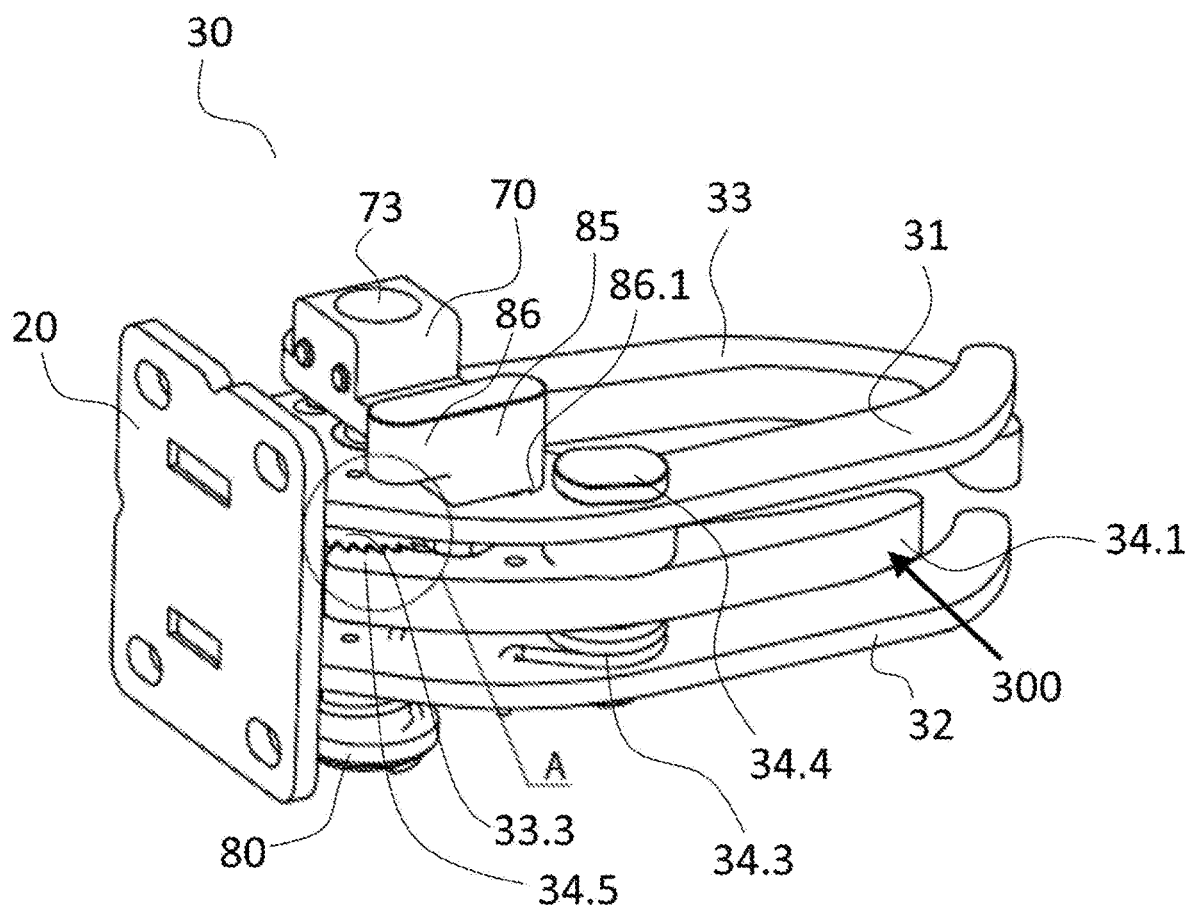
In FIG. 9a, another perspective view regarding the locked state of the gun rack structure having the subject matter security mechanism is given.
Figure 9B:
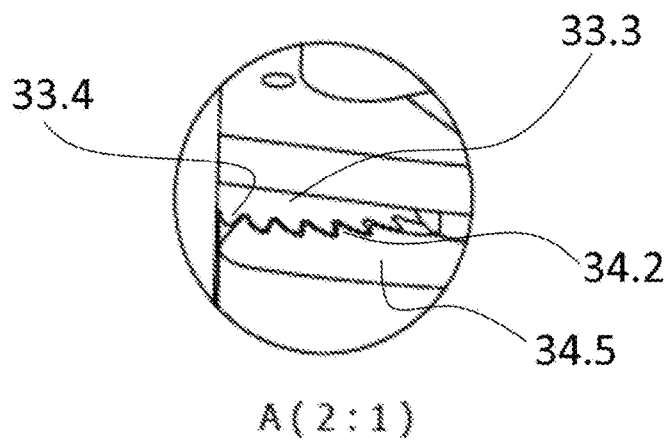
FIG. 9b shows the relationship between the geared surface of the movable part and the clawed surface of the latch structure in the locked position of the gun rack structure having the inventive security mechanism.
Figure 10A:
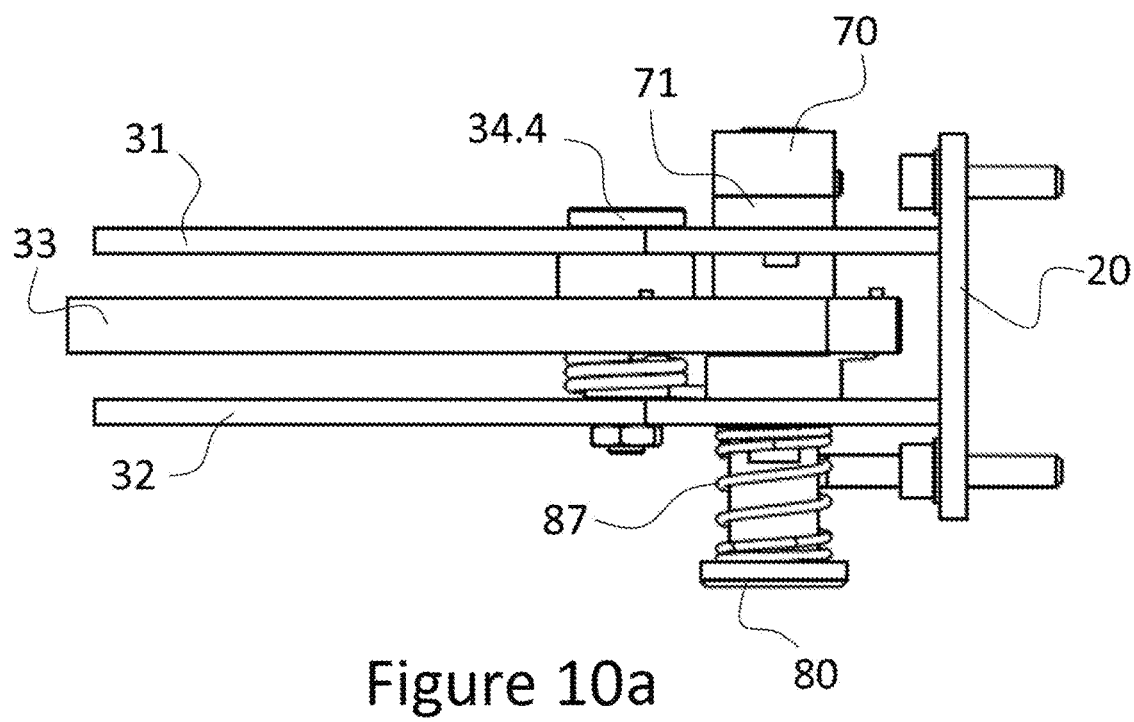
In FIG. 10a, a side view of the locked state of the gun rack structure with the inventive security mechanism is given.
Figure 10B:
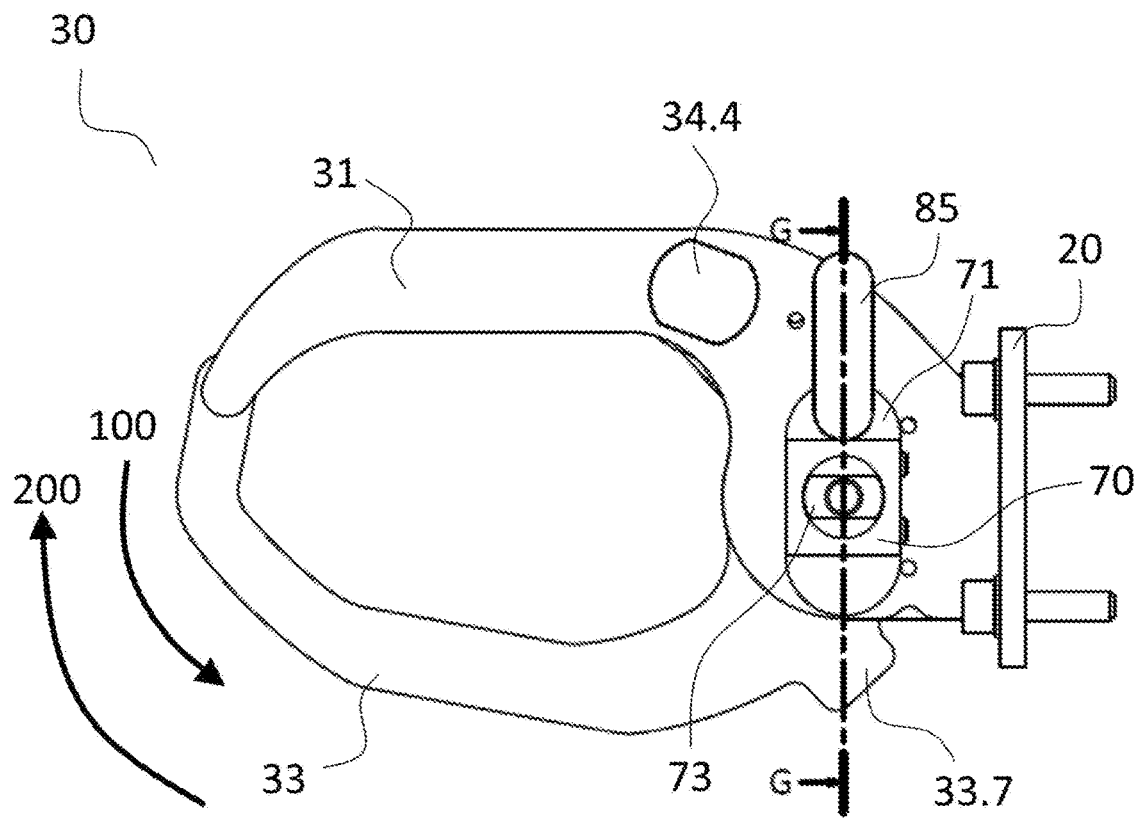
In FIG. 10b, a top view regarding the locked state of the gun rack structure with the inventive security mechanism is given.
Figure 11A:
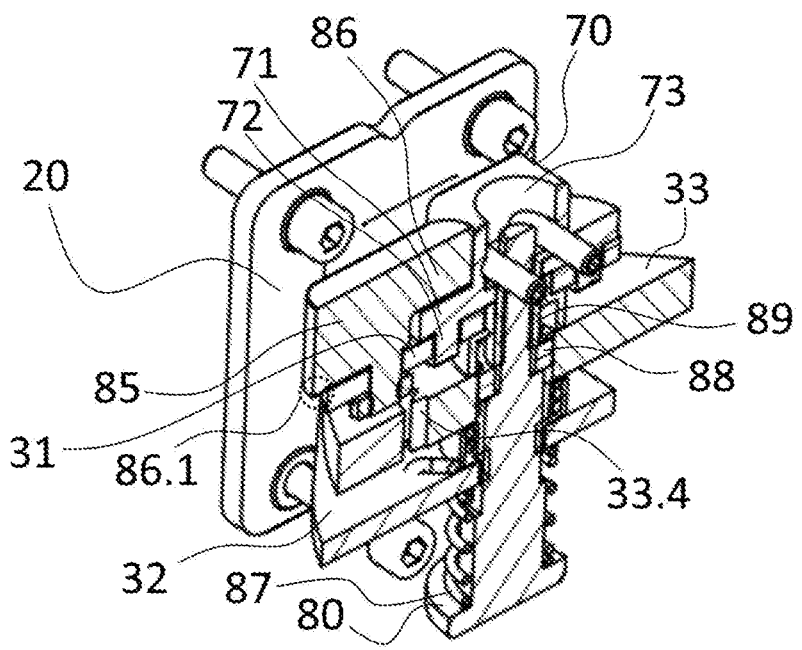
In FIG. 11a, a sectional perspective view is given regarding the active state of the security lock and security lock in the gun rack structure of the invention.
Figure 11B:
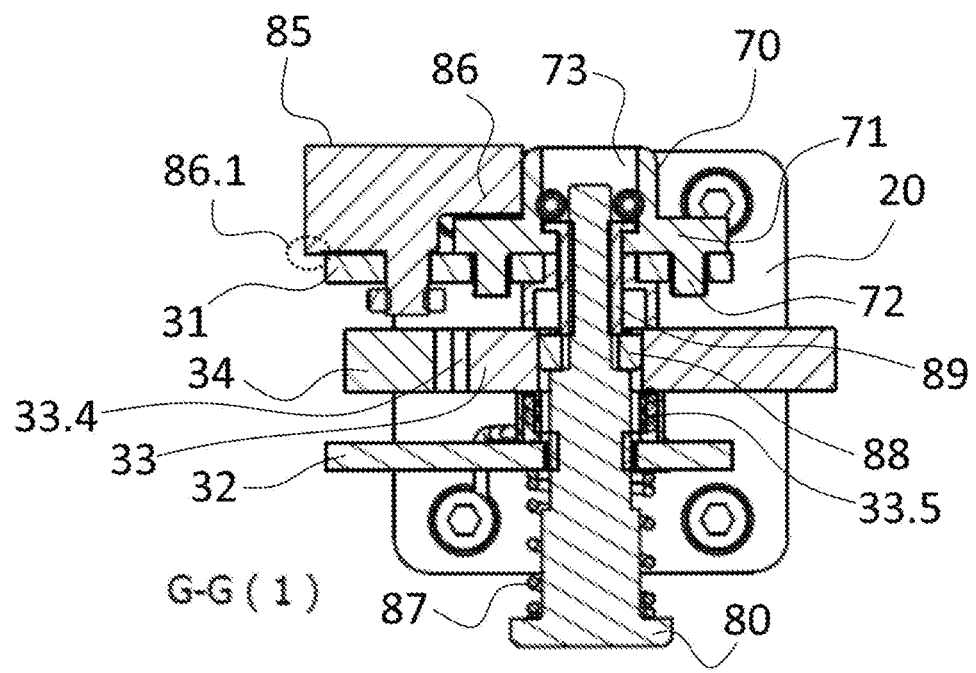
In FIG. 11b, a sectional view is given regarding the active state of the security lock and security lock in the gun rack structure of the invention.
Figure 12:
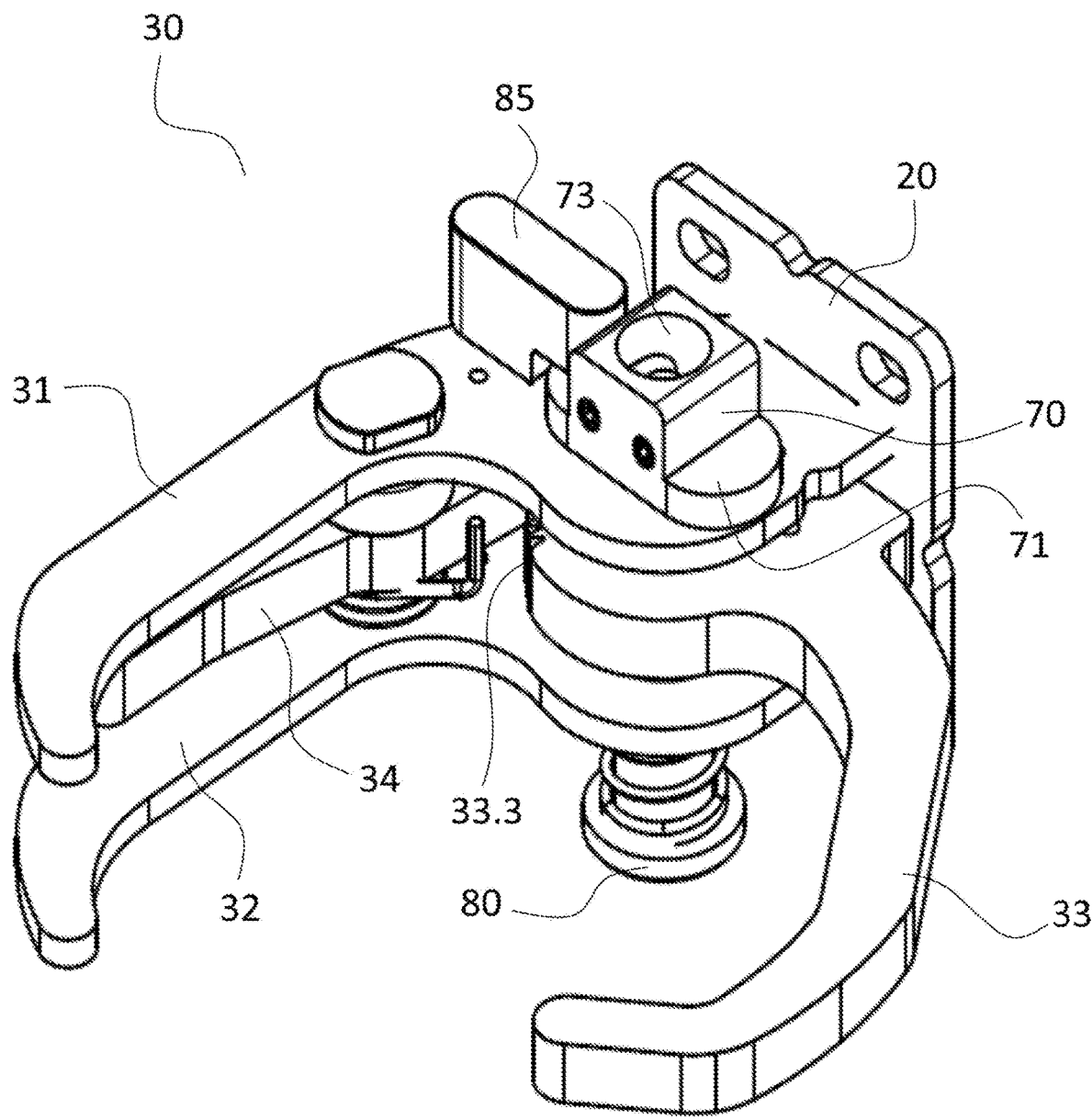
In FIG. 12, a top perspective view regarding the free state of the gun rack structure with the inventive security mechanism is given.
Figure 13:
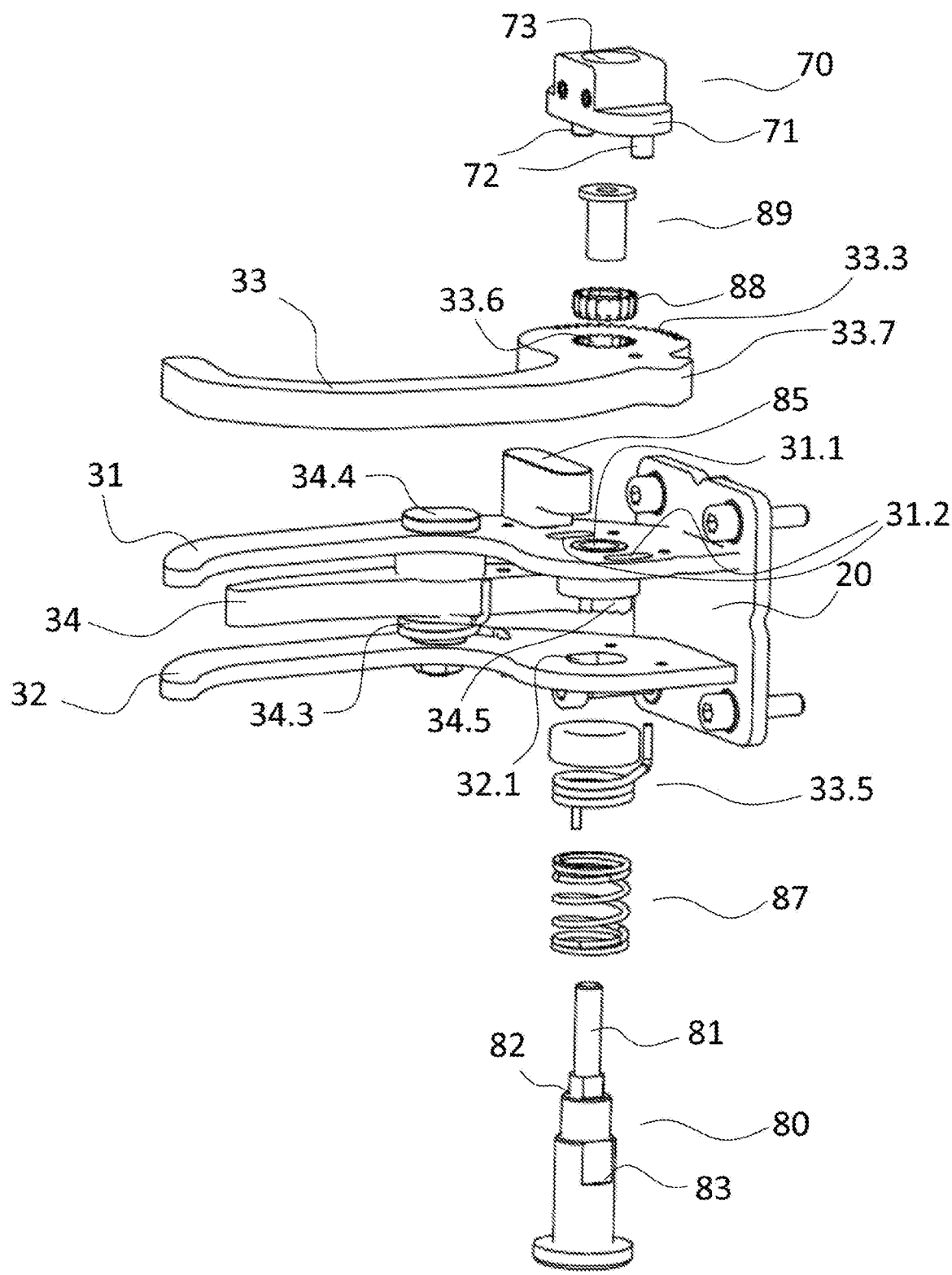
In FIG. 13, a perspective view regarding the exploded state of the gun rack structure with the inventive security mechanism is given.

In the embodiment given in FIGS. 1a-6d, under normal conditions, it is located at the end of the latch (34) component and provides locking. There is no possibility that the locking is unintentionally separated from the geared surface (33.3) on which it is placed and consequently the disengaged etc. of the weapon (60) or etc. However, in extreme situations such as war situations, where impacts such as mine explosions are exposed etc. or as a result of accidental contact of the personnel, even if it is very small possibility, the claw (34.2) located at the tip of the latch (34) component, which provides the locking, is unintentionally removed from the geared surface (33.3) on which it is placed. As a result of the separation, there may be the possibility of situations such as the weapon (60) being disengaged and etc. In FIGS. 7-13 are given the visuals of an embodiment of the inventive gun rack (30), designed for such extreme situations, equipped with additional security. Under extreme conditions such as mine explosion or as a result of inadvertent contact of the personnel, thanks to these additional security conditions, there is no possibility of unintentionally separation the clawed surface (34.5), which is located at the end of the latch (34) component and provides locking, from the geared surface (33.3) on which it is placed and with this, the result of the possibility of experiencing situations such as the weapon (60) being disengaged is completely eliminated.

As it can be seen from the aforementioned figures, subject of the invention is the gun rack (30) structure that having the additional security mechanism; a first fixed part (31), a second fixed part (32) positioned parallel to mentioned first fixed part (31) and spaced between them, the geared slot (33.6) and the geared surface (33.3) consisting at least one knurl (33.4) on its outer part, a movable part (33) that allows the gun rack (30) to open and close by rotating at a certain angle between the mentioned first fixed part (31) and the second fixed part (32), a latch (34) is having a clawed surface (34.5) comprising at least one claw (34.2) tracking mentioned geared surface (33.3), thus enabling the movable part (33) to be fixed (locked) in the closed position, a geared part (88) that prevents the rotational movement of the movable part (33) by settling inside mentioned geared slot (33.6) in the closed position of the mentioned movable part (33), a security lock (70) that allows the geared part (88) to be pulled upwards by keeping it outside of the movable part (33) by associating it with mentioned geared part (88) via geared part connection (89); the security spring (87) moves upward, which is rigidly associated with the mentioned geared part connection (89) (tight fit or any other way), and when the mentioned security lock (70) is pulled up, and squeezed between the second fixed part (32) and the lock, thus the security pin (80) gains the energy of kinetic (motion) which is required for the movement in reverse direction. Thus, as a result of any extreme explosion impact or personnel contact, the connection between the geared surface (33.3) of the movable part (33) and the clawed surface (34.5) of the latch (34) disappears by itself, and since the geared part (88) is inside the geared slot (33.6) on the movable part (33) even in the case where the movable part (33) is disengaged, the gun rack (30) maintains its closed position. In the solution that is the subject of the invention, the gun rack (30) is brought to the open position only when the security lock (70) is pulled upward by the authorized person (that is, it brings the security lock to inactive position) and in consequence of this, the removal of the mentioned geared part (88) from the geared slot (33.6) on the movable part (33) and then pressing the latch (34) with a thrust force in the force application direction (300) and cutting the connection between the geared surface (33.3) of the movable part (33) and the clawed surface (34.5) of the latch (34). In the security mode, that is, when the security lock (70) has not been pulled upwards yet, the fixing protrusions (72) at the bottom of the side extensions (71) of the security lock (70) are located inside the fixing bores (31.2) tracking these extensions on the first part (31). When the security lock (70) is pulled up to the extent that the mentioned fixing protrusions (72) are disengaged from the mentioned fixing bores (31.2) and this fixing protrusion rotated around the z-axis less than 180 degrees on the same line, the mentioned fixing protrusions (72) will no longer track to the fixing bores (31.2). Thus the security lock (70) cannot return to its previous position and the security lock (70) is stayed/fixed in its inactive position. The mentioned security pin (80) and geared part connection (89) are rigidly engaged to each other through the first connection bore (31.1) on the first fixed part (31) and the second connection bore (32.1) on the second fixed part (32). Since the security lock (70) is engaged to the security pin end (81) via the geared part connection (89), the upward movement of the security lock (70) ensures the upward movement of the geared part on the gear part slot (82) of the security pin (80) and the security pin (80). Thus, as the security lock (70) is pulled up, the geared part (88) also moves upwards and disengaged from the geared slot (33.6) located on the movable part (33). The motion blocker protrusion (83) on the security pin (80) is in a position to allow the security pin (80) to move upwards at least as much as the size of the geared part (88) or much more than that. In the case where the security pin (80) goes up as much as the specified height, the mentioned motion blocker protrusion (83) is stopped by the lower surface of the second fixed part (32) and the lower part prevents the security pin (80) from moving up further. In the preferred embodiment of the present invention, the geared part connection (89) is passed through the upside of the geared connection bore (73) inside the security lock (70) and embed it/fixed so that the security lock slot with bores come over and stay on top of the geared part connection (89). The geared slot (33.6) is designed to include at least one recess/slot tracking at least one gear on the geared part (88). Thus, when the geared part (88) is inside the geared slot (33.6), the geared part (88) is prevented from turning around itself. By increasing the number of gear and grooves/slots tracking each other, it is possible to provide a more stable mechanism that is not affected by vibrations.

In another embodiment of the invention, as an addition to all the security measures described above, an another security lock (85), which is defined rotatably around its own axis on the first fixed part (31), is providing to fixed in active position of the security lock (70). The reason for the setting of such an additional security structure is an extreme explosion etc. In this case, it eliminates the possibility of the security lock (70) being pulled up automatically and becoming inactive. The security lock protrusion (86) of the mentioned security lock provides additional security in the active position such that it overlaps one of the side extensions (71) of the security lock (70). Thus, it prevents the security lock (70) from moving upwards. In order for the security lock (85) to make it work, the height of the mentioned side extension (71) must be less than the height where the security lock protrusion (86) of the security lock begins. In the preferred embodiment of the invention, the height of the side extensions (71) of the security lock (70) is less than the actual height of the security lock (70). Furthermore, in the preferred embodiment of the invention, there is a security lock claw (86.1) at the rear lower part of mentioned security lock (85). The mentioned security lock claw (86.1) sits on the outer upper edge/side of the first fixed part (31), preventing it from rotating freely around its own axis. In order to make the security lock (85) inactive, it is necessary to lift the security lock (85) slightly upwards enough to allow the security lock claw (86.1) to get rid of this seat. Thus, the security lock claw (86.1) can be removed from the edge of the first fixed part (31) and can be removed by the rotation movement it will make over the side extension (71) of the security lock (70), that is, it can be made inactive. To sum, in order to remove the weapon (60) from the gun rack (30) in the embodiment with the security lock (85), it is necessary to inactivate firstly newly mentioned the security lock (85) then secondly security lock (70) and finally the latch (34) structure.

Since in the present invention of the mentioned fixing protrusions (72) will not be tracking the fixing bores (31.2) on the first fixed part (31) when the security lock (70) is pulled upwards and rotated a little less than 180 degrees, it remains on the upper surface of the first fixed part (31). Thus, it allows the security lock (70) to remain on its inactive (pulled up) position. After providing the same function in another embodiment of the present invention, It is possible that the fixation protrusions are on the first fixed part (31) whereas the fixing bores are on the security lock (70).

When the weapon (60) is placed in the gun rack (30), after the gun rack (30) is switched to its closed position (active position), firstly the security lock (70) and then the security lock (85) are switched to their active positions respectively. In order to switch the security lock (70) to its active position, the fixing protrusions (72) on the lower part of the security lock (70) must be rotated and placed/seated in the fixing bores (31.2) on the first fixed part (31). Thus, the geared part (88) is placed/seated in the geared slot (33.6) on the movable part (33) again and it ensures the fixation of the movable part (33) in the position where it is located. The downward movement of the mentioned geared part (88) is provided by the release of the potential energy accumulated as a result of the compression in the security spring (87) during the pulling upward (inactivation) of the security lock (70) while the security lock (70) returns to its previous position.

In another embodiment of the invention, it is also possible to integrate the security pin (80) and the geared part (88) and thus, by pulling downward of the security pin (80), the geared part (88) can move downwards and disengage from the geared slot (33.6).

On the other hand, a gun holder assembly (1), which having a gun rack (30) with the security mechanism described above with different alternative structures; has preferably a body structure (1.1) and a gun-stock holder (11) positioned at the lower part of mentioned body structure (1.1) to seat the gun stroke (63) part of the weapon (60) and mentioned gun rack (30). The mentioned body structure (1.1) can be used/structured on any column, wall etc. of the place or inside the vehicle. In one of the preferred embodiments, the mentioned gun-stock holder (11) is engaged with the body structure (1.1) by means of a lower bracket (10). In another preferred embodiment, the gun rack (30) is engaged with the body structure (1.1) by means of an upper bracket (20).

The mentioned first fixed part (31) and second fixed part (32) are C-shaped and are fixed to the upper bracket (20) parallel to each other with a certain distance between them. The movable part (33) which is inverted C-shaped is engaged to be parallel to between the first fixed part (31) and the second fixed part (32), which are parallel to each other, with a certain independence of rotation. The rotation limiting part (33.7), which is defined on the outer side surface of the movable part (33), contacts with the upper bracket (20) during its opening and restricts the opening amount of the movable part (33).

The mentioned latch (34) is engaged between the first fixed part (31) and the second fixed part (32) in parallel to both in rotating manner by means of the latch connector (34.4) and the latch spring (34.3). The clawed surface (34.5) part of the latch (34), which has a clawed surface (34.5) on one side and a handle part (34.1) on the other side, is engaged with the geared surface (33.3) of the movable part (33). As long as no force is applied on the handle part (34.1) of the latch (34), the latch (34) is closed in such a way that the clawed surface (34.5) structure engages the geared surface (33.3) of the movable part (33). The latch spring (34.3), which is placed around the latch connector (34.4) between the movable part (33) and the second fixed part (32), provides the latch (34) to be engaged in a manner that tends to remain closed. The clawed surface (34.5) part of the latch (34) moves on the geared surface (33.3) of the movable part (33) and determines the closing amount of the gun rack (30). This determination allows to adjust the closing amount of gun rack according to the size of the gun fore-end (62) or barrel (61) in the gun rack (30). The direction of the knurl (33.4) on the geared surface (33.3) is made inclined towards the opposite of the closing direction (200) so as to ease the movement of the movable part (33) in the closing direction. This inclination direction also provides unidirectional movement and prevents the movable part (33) from moving in the opening direction (100). In order to prevent the weapon (60) from being affected by external vibrations, the gun rack (30) completely wraps the fore-end (62) or barrel (61) of the gun (60), it is important that the clawed surface (34.5) is moved on the geared surface (33.3) for wrapping up to the end point allowed by the fore-end (62) or barrel (61) dimensions. Moreover, thanks to the unidirectional movement of the clawed surface (34.5) structure on the geared surface (33.3) and the ability to be fixed between the knurls (33.4), the latch (34) will not disengage the knurl (33.4) even in situations exposed to shock and vibration such as mine explosion, bad environmental conditions etc and will provides the necessary protection and security.

The geared surface (33.3) must include at least one knurl (33.4). It is preferred that the number of knurl (33.4) is higher in order to be able to adjust the gun rack (30) according to different types of gun fore-end (62) or barrel (61) structures. The changes such as increasing the number of knurl (33.4) and reducing the angle between knurls (33.4) allow to make more precise adjustment in the wider weapon (60) spectrum. Likewise, the clawed surface (34.5) should include at least one claw (34.2). The increase in the number of knurl (33.4) on the geared surface (33.3) and the number of claws (34.2) on the clawed surface (34.5) strengthens the engagement/contact between these two surfaces in the closed position.

When force is applied on the handle part (34.1) of the latch (34) in the force application direction (300), the clawed surface (34.5) is moved backwards from the geared surface (33.3) and the movable part (33) is disengaged. Potential energy previously stored on the spring (33.5) returns the disengaged movable part (33) to its initial position by applying a force towards the opening direction (100).

The invention claimed is:

1. A gun rack assembly configured to fixedly secure a weapon, the weapon having a fore-end structure or a barrel structure, the gun rack assembly comprising:
    a first fixed part;
    a second fixed part in parallel spaced relation to said first fixed part;
    a movable part having a geared surface and a knurled surface, said movable part being rotatably connected in parallel relation between said first fixed part and said second fixed part, said movable part adapted to allow the gun rack assembly to open and close;
    a latch having a handle part on one side thereof, said latch having at least one claw on an opposite side thereof, the at least one claw extending across the geared surface of said movable part, said latch being rotatably connected and being parallel to said first fixed part and said second fixed part so as to fix said movable part in a closed position and adapted to determine an amount of the closing of the gun rack in relation to a size of the fore-end structure of the barrel structure.

2. The gun rack assembly of claim 1, further comprising:
    a geared slot positioned on an axis of rotation of said movable part;
    a geared part positioned inside said geared slot so as to prevent rotation of said, movable part when said movable part is in a closed position;
    a security lock that allows said geared part to be pulled upwardly from exterior of said geared slot, said security lock being connected to said geared part via a geared part connection; and
    a security in rigidly connected to the geared part connection so as to store motion energy by compression of a security spring, the security spring positioned between said second fixed part and the security pin when said security lock is pulled upwardly.

3. The gun rack assembly of claim 2, wherein said security lock has at least one side extension and at least one fixing protrusion at the at least one side extension.

4. The gun rack assembly of claim 3, wherein said first fixed part has at least one fixing bore that coincides with the at least one fixing protrusion.

5. The gun rack assembly of claim 2, further comprising:
    another security lock having, a security lock protrusion that blocks upward movement of said security lock so as to fix said security lock in an active position, said another security lock being rotatably connected to said first fixed part.

6. The gun rack assembly of claim 2, wherein said security lock has a security lock claw that resides on an outer upper edge of said first fixed part so as to prevent said security lock from rotating freely.

7. The gun rack assembly of claim 5, where said another security lock has a security lock claw that resides on an outer upper edge of said first fixed part so as to prevent said another security lock from rotating freely.

* * * * *